(12) United States Patent
Dezzani

(10) Patent No.: US 8,382,411 B2
(45) Date of Patent: Feb. 26, 2013

(54) SELF-LOCKING NUT

(75) Inventor: Marco Dezzani, Forno Canavese (IT)

(73) Assignee: Gally S.p.A., Forno Canavese (TO) (IT)

( * ) Notice: Subject to any disclaimer, the term of this patent is extended or adjusted under 35 U.S.C. 154(b) by 0 days.

(21) Appl. No.: 12/999,237

(22) PCT Filed: May 25, 2009

(86) PCT No.: PCT/IB2009/052169
§ 371 (c)(1),
(2), (4) Date: Dec. 15, 2010

(87) PCT Pub. No.: WO2009/153678
PCT Pub. Date: Dec. 23, 2009

(65) Prior Publication Data
US 2011/0164940 A1    Jul. 7, 2011

(30) Foreign Application Priority Data
Jun. 16, 2008   (EP) .................................... 08425426

(51) Int. Cl.
*F16B 39/28*   (2006.01)
(52) U.S. Cl. ........................................ 411/278; 411/324
(58) Field of Classification Search .................. 411/278, 411/280, 324
See application file for complete search history.

(56) References Cited

U.S. PATENT DOCUMENTS

| | | | | |
|---|---|---|---|---|
| 2,424,604 A | * | 7/1947 | Dzus | 411/278 |
| 3,381,732 A | * | 5/1968 | Engelmann | 411/265 |
| 3,417,801 A | * | 12/1968 | Berberian | 411/278 |
| 3,840,366 A | * | 10/1974 | Hirayama et al. | 148/326 |
| 4,040,462 A | * | 8/1977 | Hattan | 411/277 |
| 4,893,977 A | | 1/1990 | Tramezzani | |
| 4,902,472 A | * | 2/1990 | Isobe et al. | 420/49 |
| 5,035,855 A | * | 7/1991 | Utsunomiya et al. | 420/61 |
| 5,160,227 A | | 11/1992 | Tramezzani | |
| 2005/0126661 A1 | * | 6/2005 | Zetterholm et al. | 148/326 |

OTHER PUBLICATIONS

L. Godfrey, Steel Springs, Properties and Selection: Irons, Steel and High-Performance Alloys, vol. 1, ASM Handbook, p. 302-326, 1990.*

"Announcement", Machine Design, Penton Media, Cleveland, OH, US, vol. 67, No. 13, Jul. 27, 1995, p. 42, XP000530356, ISSN: 0024-9114, the whole document.

International Search Report for PCT/IB2009/052169, dated Sep. 9, 2009.

Gabriele Di Caprio, Glil Acciani Inossidabili (Stainless Steels), Biblioteca Tecnica Hoepli, 2006-2007, p. 101 and 104.

* cited by examiner

*Primary Examiner* — Flemming Saether
(74) *Attorney, Agent, or Firm* — Sughrue Mion, PLLC (57) ABSTRACT

The invention relates to a self-locking nut (1) having an upper threaded collar (3) provided with longitudinal slots (7), being V or U shaped, also with sharp edge, defining in the collar a plurality of circular arc segments (9) compressed by an external helical spring (5), and in which the collar slots have such a width as not to allow the mutual contact of the circular arc segments (9) compressed by the spring. The spring of the self-locking nut is made of precipitation hardening stainless steel whereby it shows high constancy of braking torque features even for repeated screwing/unscrewing cycles. The invention also relates to a method for manufacturing the nut.

9 Claims, 8 Drawing Sheets

FIG. 1 (KNOWN ART)

FIG. 2 (KNOWN ART)

FIG. 3 (KNOWN ART)

FIG. 4 (KNOWN ART)

SELF-LOCKING NUT

CROSS REFERENCE TO RELATED APPLICATIONS

This application is a National Stage of International Application No. PCT/IB2009/052169 filed May 25, 2009, which claims priority from European Patent Application No. 08425426.7 filed Jun. 16, 2008, the contents of all of which are incorporated herein by reference in their entirety.

TECHNICAL FIELD

The present invention refers, in general, to a self-locking nut of the type having a cylindrical end compressed by a helical spring.

BACKGROUND ART

Different types of self-locking nuts are known.

For instance U.S. Pat. No. 4,893,977 discloses a self-locking nut, wherein "V" or "U" shaped slots are provided in the cylindrical end, said slots being arranged for being elastically compressed by a radially operating external helical spring.

U.S. Pat. No. 5,160,227 discloses a self-locking nut of the type cited above, wherein, in order to improve the corrosion strength performances and to allow use at temperatures over 250° C., it is provided that the helical spring is made of stainless spring steel, such as the so-called AISI (American Iron and Steel Institute) 302 steel.

The Applicant has noted, in general, that, as a result of the technological evolution of different devices in terms of increased speed of moving parts, increased vibrations of such parts and increased operating temperatures, there is a growing demand for nuts having, in particular, high braking torque when disassembled (unscrewing braking torque) for use both at ambient temperature and at high temperatures.

Figure 1:
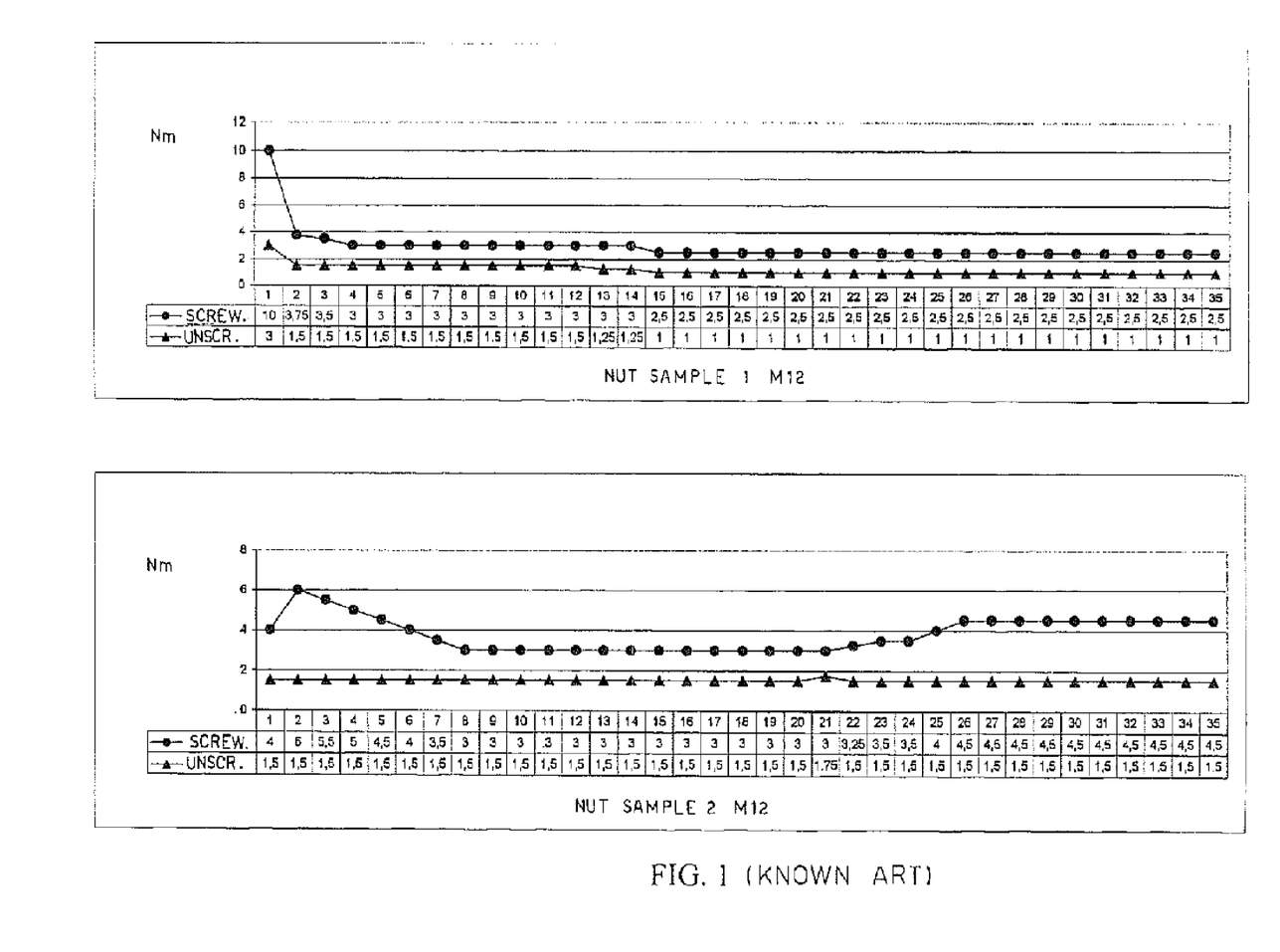
FIG. 1 (PRIOR ART) shows braking torque values in Newton per meter (Nm) measured upon increasing number of screwing/unscrewing cycles; values relate to tests of use at ambient temperature of two nut samples M12 of known type.
Figure 2:
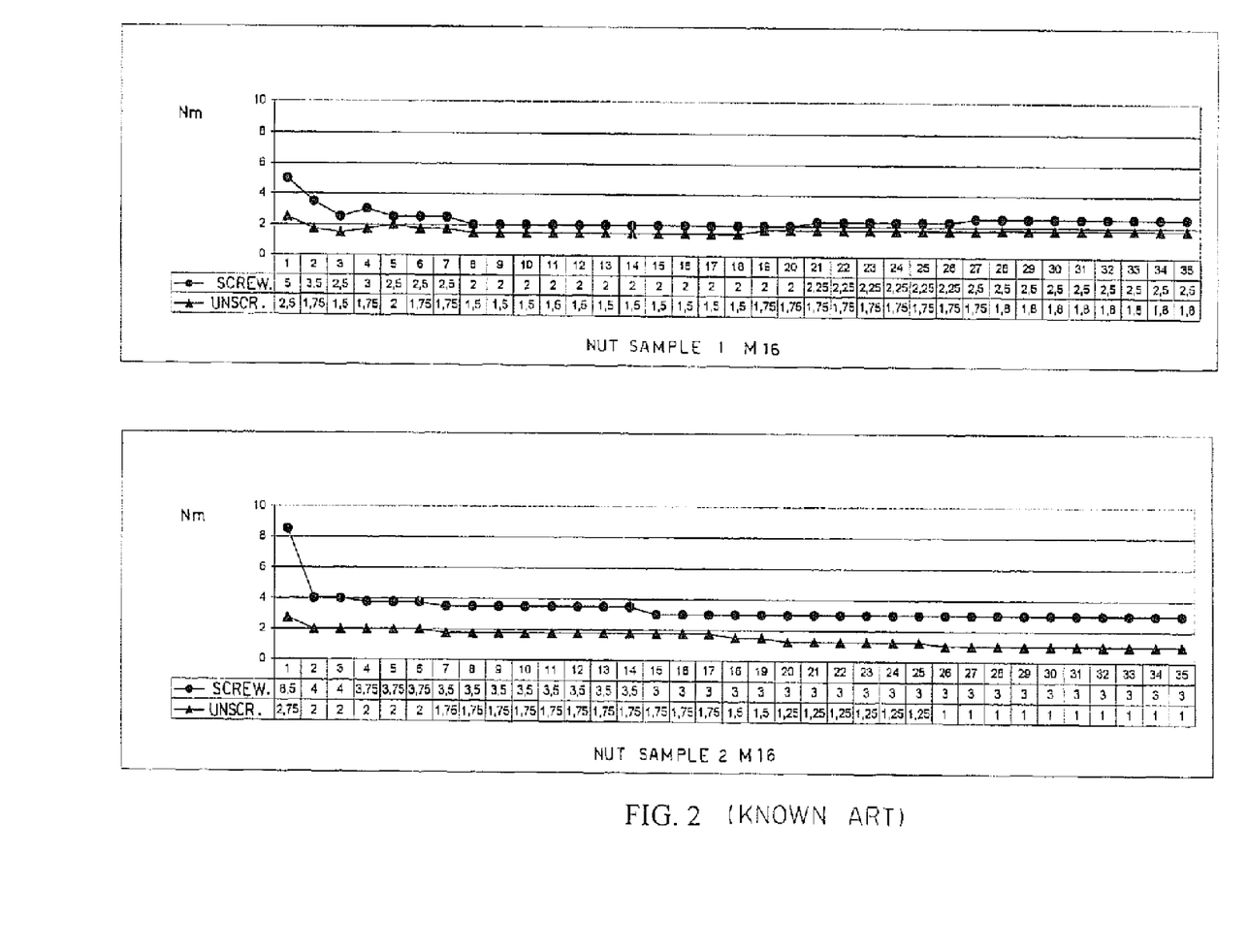
FIG. 2 (PRIOR ART) shows braking torque values in Newton per meter (Nm) measured upon increasing number of screwing/unscrewing cycles; values relate to tests of use at ambient temperature of two nut samples M16 of known type.
Figure 3:
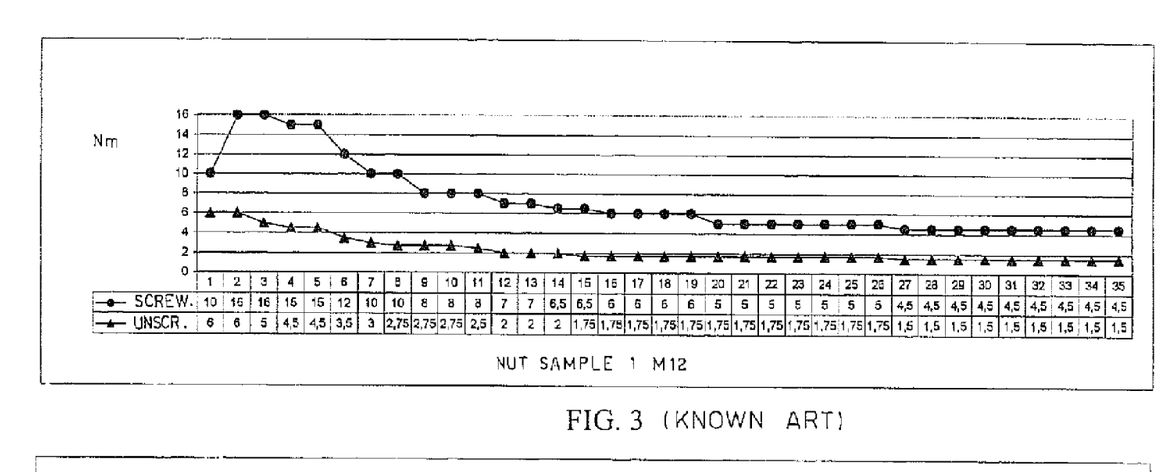
FIG. 3 (PRIOR ART) shows braking torque values in Newton per meter (Nm) measured upon increasing number of screwing/unscrewing cycles; values relate to tests of use at high temperature of two nut samples M12 of known type.
Figure 4:
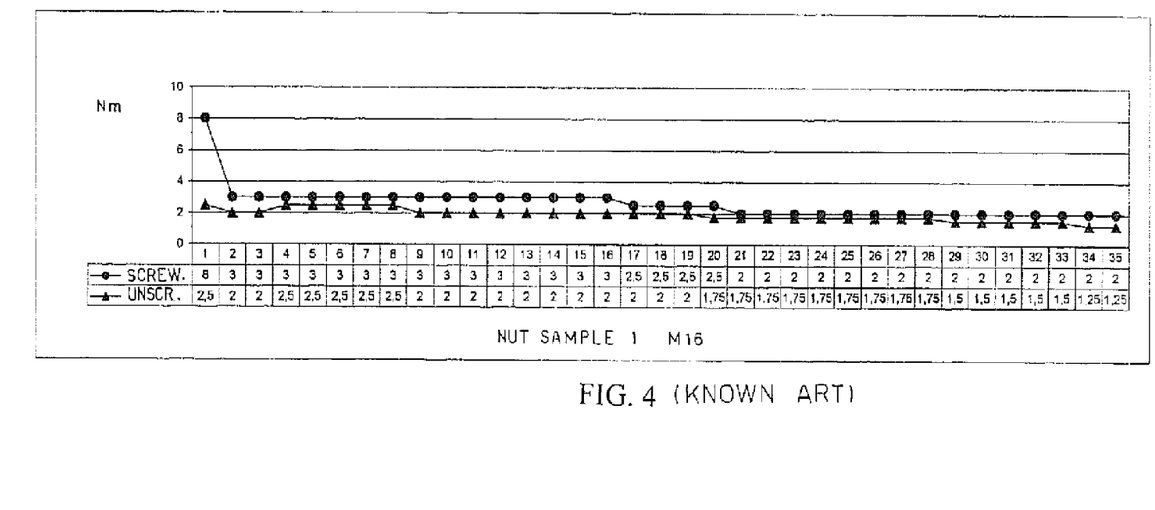
FIG. 4 (PRIOR ART) shows braking torque values in Newton per meter (Nm) measured upon increasing number of screwing/unscrewing cycles; values relate to tests of use at high temperature of two nut samples M16 of known type.

The known nuts in which the spring is made of stainless spring steel such as the AISI 302 steel, though having a very high braking torque at their first unscrewing, show, as illustrated in FIGS. 1 and 2 (corresponding to use at ambient temperature, e.g. from −50° C. to 100° C.) and in FIGS. 3 and 4 (corresponding to use at high temperature, e.g. from 300° C. to 400° C.), a progressive decay of the features or measures of braking torque in Newton per meter (Nm) when the number of screwing/unscrewing cycles increases, with the consequence that their re-use is substantially not very reliable.

In FIGS. 1 and 2 assembling and disassembling braking torque (screwing torque) values as measured in tests at ambient temperature in 35 screwing/unscrewing cycles of two samples of nuts M12 and M16, respectively, are shown. In FIGS. 3 and 4 assembling and disassembling braking torque (screwing torque) values as measured in tests at high temperature in 35 screwing/unscrewing cycles of two samples of nuts M12 and M16, respectively, are shown.

As it appears clear from the values, the known nuts do not allow to meet the requirements to maintain the performances of the nuts constant and high in terms of braking torque, in particular in those technological contexts in which the nuts must be reused safely on parts, so-called wear parts, that require a high number of replacements in the life period of the devices of which they are part.

An example of such use can be a wear part for a vehicle in which it is provided that, after every replacement of the consumed part, the new mounted part maintains an high operating reliability.

This problem, of course, exists both for use at ambient temperature (FIGS. 1 and 2) and for use at high temperature (FIGS. 3 and 4).

The Applicant has substantially noted that as a result of the technological evolution, in current practice the known nuts, when applied, in particular, for fastening wear parts, involve the problem that the replacement of the consumed parts is also associated necessarily to the replacement of the nuts in order to avoid the risk of performance decay of the nuts themselves.

Therefore there exists the technical problem of avoiding the replacement of the nuts following, for instance, maintenance operations on wear parts because the replacement of the nuts involves both high maintenance costs and material waste; this last is a problem as to which the sensibility of the market has grown in an optical of limitation in the exploitation of the energetic resources.

DISCLOSURE OF THE INVENTION

The object of the nut subject of the present invention is to provide a nut that, while even maintaining the structure of the known nuts, allows, with limited material costs, to obtain the advantages of:

operating at ambient temperature and at elevated temperatures, for instance at least over 300° C.;

assuring in all conditions unscrewing braking torques of approximately a factor of 2 higher than the known nuts;

assuring substantial unchanging of screwing and unscrewing braking torques for a high number of screwing/unscrewing cycles, for instance for at least 30 screwing/unscrewing cycles.

This object is achieved by means of the improved self-locking nut and the corresponding manufacturing process as claimed.

The claims are an integral part of the teaching of the present invention.

According to a preferred embodiment the self-locking nut comprises an upper threaded collar having longitudinal slots, V or U shaped also with sharp edge, defining in the collar itself a plurality of circular arc segments and one external helical spring arranged to compress the segments and made of precipitation hardening stainless steel.

According to a further feature of the nut according to the present invention, the spring is made of precipitation hardening stainless steel of the semi-austenitic type.

BRIEF DESCRIPTION OF DRAWINGS

These and further features and advantages of the present invention will appear more clearly from the following detailed description of a preferred embodiment, provided by way of non-limiting example with reference to the attached drawings, in which components designated by same or similar reference numerals indicate components having same or similar functionality and structure and wherein.

BEST MODE FOR CARRYING OUT THE INVENTION

Figure 5:
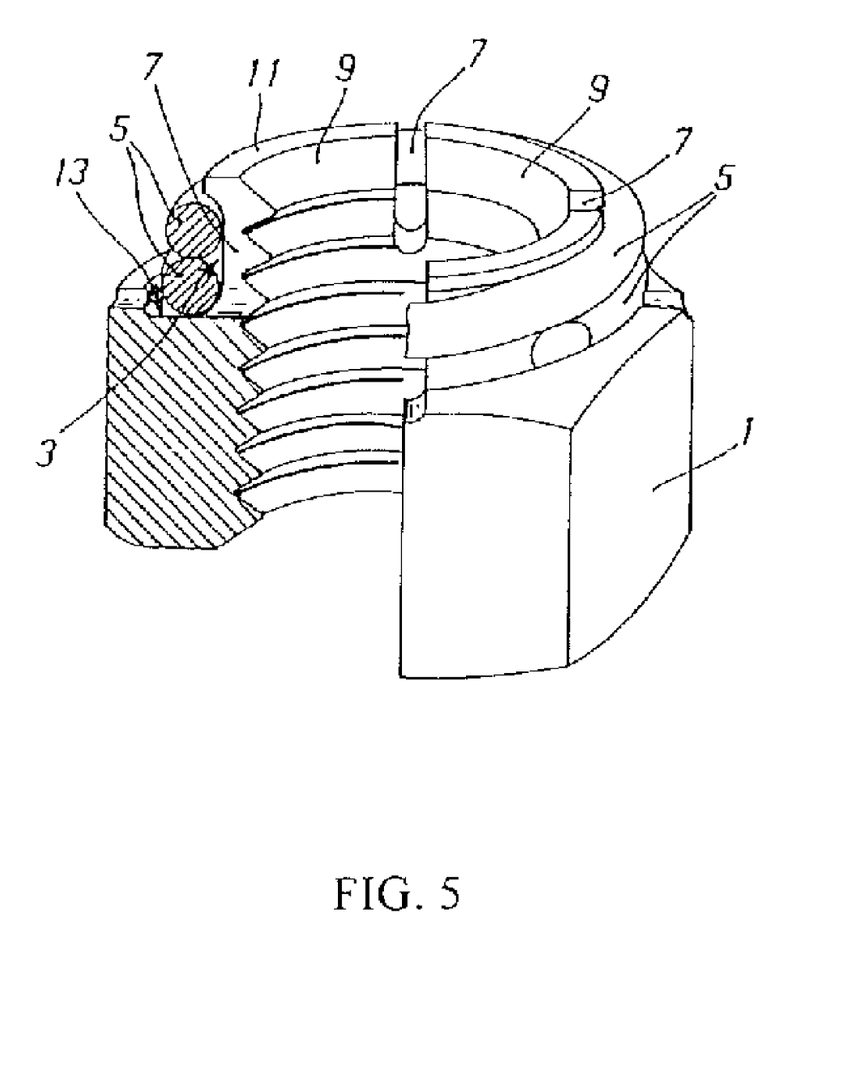
FIG. 5 shows a perspective view of a nut according to the invention.

With reference to FIG. 5 a nut 1 according to the present invention is arranged to be screwed on a threaded rod, not shown in the figure, inside the nut itself and is arranged, for instance, to fasten wear parts of devices. The nut has a structure of known type and comprises a collar 3 on which a helical spring 5 is wound operating with radial pressure on the collar 3 and, through this, on the threaded rod on which the nut is applied.

The structure of the nut 1 comprises a plurality of slots 7, preferably "U" shaped, provided into the collar 3 itself. Obviously the slots, in other embodiments, may be "V" or "U" shaped with sharp edge.

Slots 7 form on the collar 3 a plurality of circular arc segments 9 having a small external upper rib 11.

In the preferred embodiment, a hollow seat 13 is provided on the upper face of the structure of the nut 1; such a seat houses a helical spring 5 that is wound around the collar 3 and is arranged to radially compress the segments 9 that in turn are arranged to exercise a certain pressure or force against the threaded rod on which the nut 1 is screwed.

In use, the spring is preferably mounted in a position opposite to the part to which the nut is fastened, for instance a wear part, whereby, as easily comprehensible to a person skilled in the art, the spring is subjected, typically, to temperatures lower than those reached by the fastened parts.

The helical spring, designed according to dimensional parameters directed to reach predetermined values of braking torque, is made of wire having different diameter depending on the dimensions of the nut.

In the preferred embodiment the spring 5 is made of precipitation hardening stainless steel named also PH (Precipitation Hardening) steel in which the presence of hardening compounds or elements soluble at high temperatures, such as aluminium or aluminium compounds, is provided.

More preferably, the spring is made of PH steel of the semi-austenitic type, such as 17-7 PH steel, named also AISI 631 steel.

Figure 10:
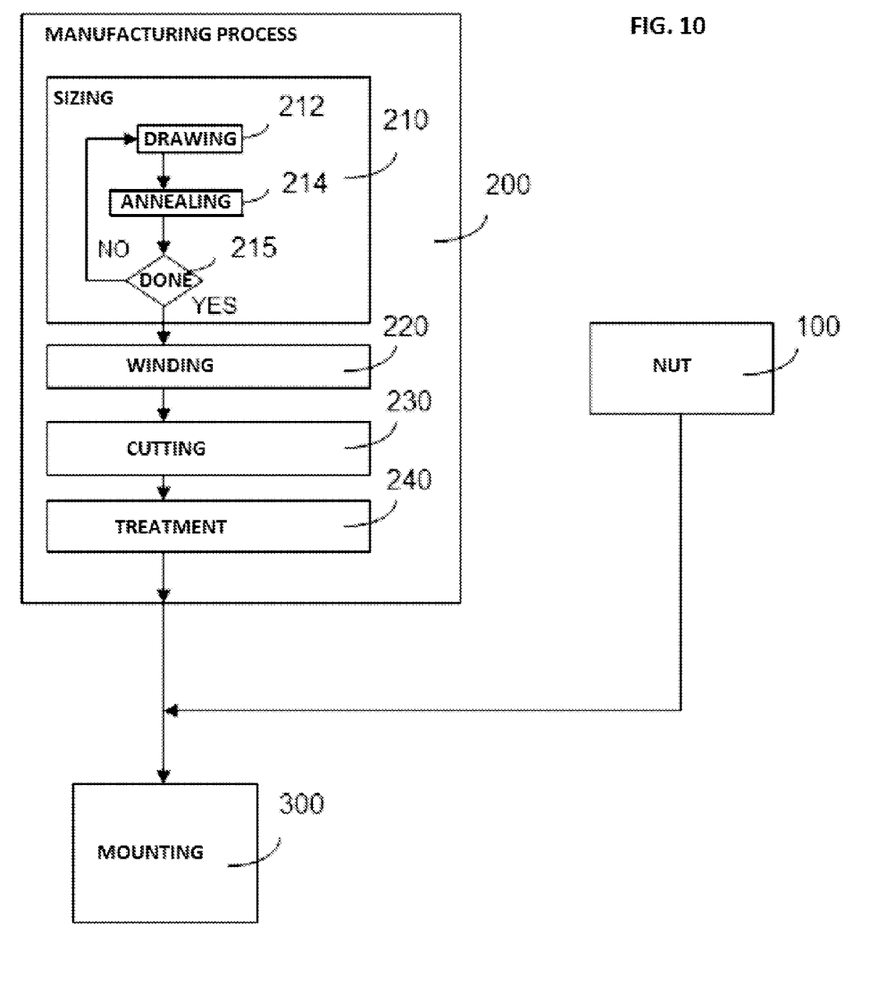
FIG. 10 shows a method for manufacturing a self-locking nut.

Preferably the manufacturing process of springs 5 (step 200) provides that wire rods or bars of foundry rolled sections made of PH steel are sized (step 210), i.e. sized to the diameter provided for the wire of the springs, through one or more steps of drawing (step 212) and intermediate annealing (steps 214, 215). In such step wires made of PH steel of predetermined dimensions are obtained.

At the end of this step (step 210), the wire is wound to diameters of predetermined dimensions (step 220) depending on design parameters and cut to lengths of some turns (step 230), for instance 2 turns, in order to reach predetermined braking torque values.

As a last step the so shaped helical springs are subjected to a stabilisation treatment (step 240), preferably of the thermal type, and mounted (step 300) on the structure of the nut, previously made (step 100), so as to realise the nut according to the invention.

The Applicant has experimentally noted, for instance by carrying out tests with springs made of 17-7 PH type steel, that nuts made by using precipitation hardening stainless steel show high braking torques at disassembling even for repeated screwing/unscrewing cycles, for instance at least 30 cycles.

In particular the Applicant has noted that upon repeated screwing/unscrewing cycles the features of braking torque remain constant both in the case of use at ambient temperature, for instance at temperatures comprised between −50° C. and 100° C., and at elevated temperature, for instance at temperatures comprised between 300° C. and 400° C.

In brief the Applicant has noted an high constancy of braking torque features upon repeated screwing/unscrewing cycles at temperatures comprised between −50° C. and 400° C., whereby the nuts according to the invention are particularly convenient in contexts in which a reliable re-use thereof is required.

Figure 6:
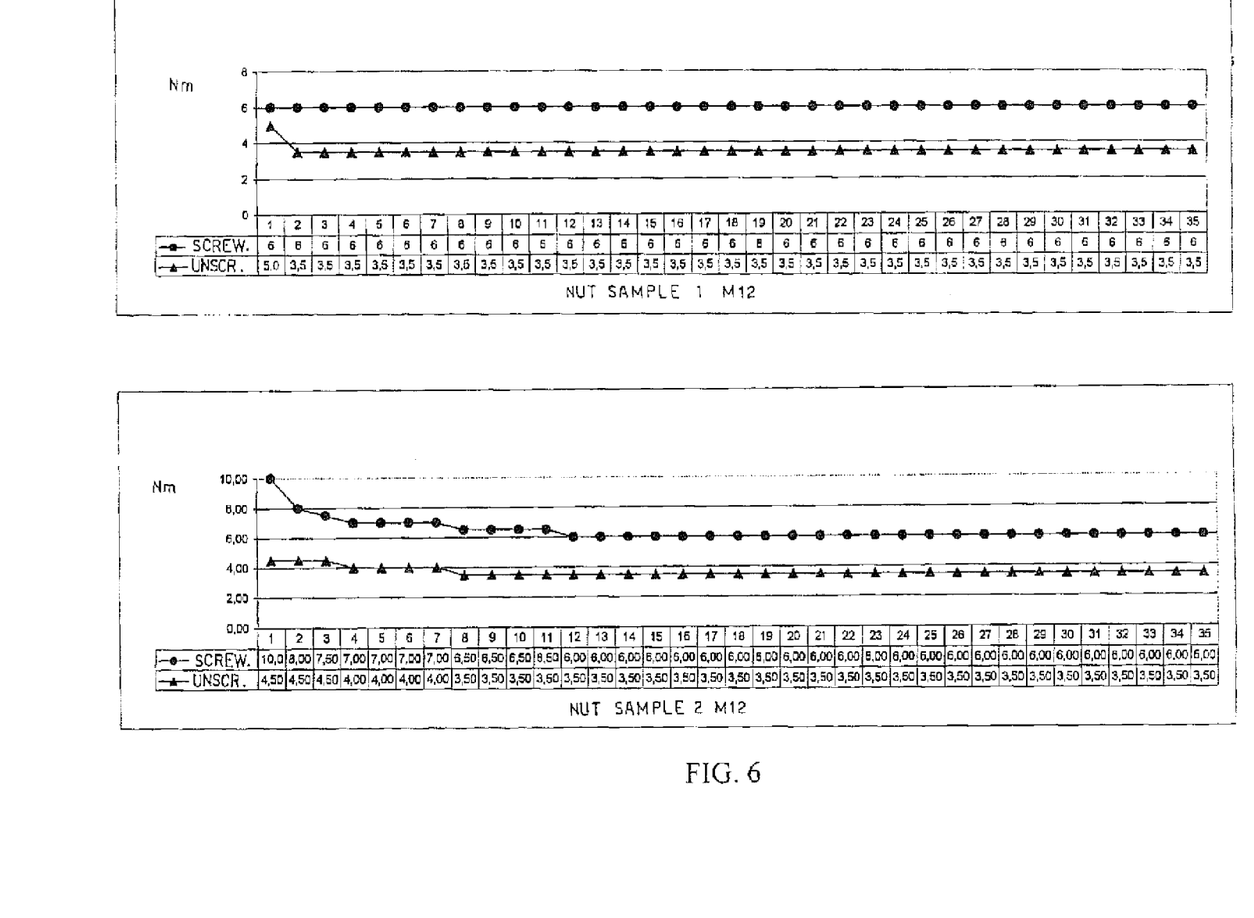
FIG. 6 shows braking torque values in Newton per meter (Nm) measured upon increasing the number of screwing/unscrewing cycles; values relate to tests of use at ambient temperature of two nut samples M12 according to the invention.
Figure 7:
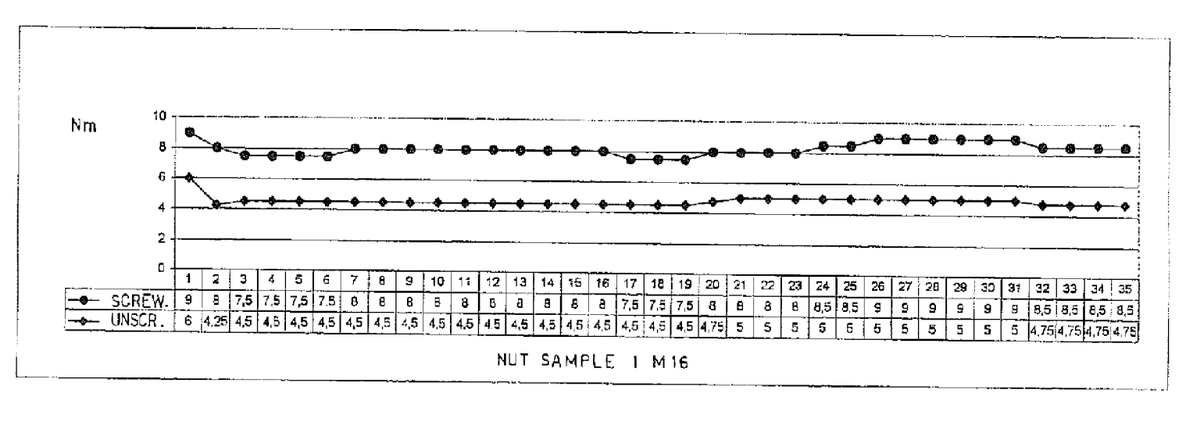
FIG. 7 shows braking torque values in Newton per meter (Nm) measured upon increasing number of screwing/unscrewing cycles; values relate to tests of use at ambient temperature of two nut samples M16 according to the invention.
Figure 8:
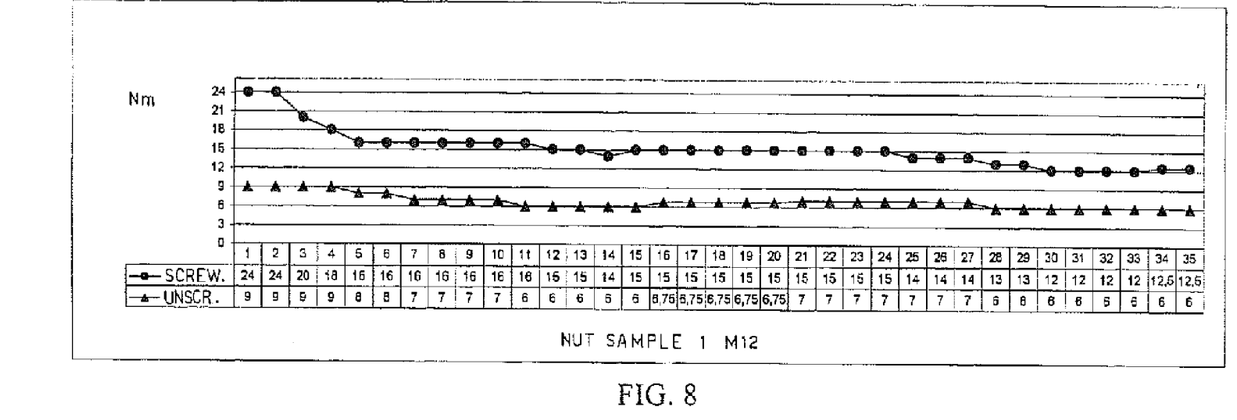
FIG. 8 shows braking torque values in Newton per meter (Nm) measured upon increasing number of screwing/unscrewing cycles; values relate to tests of use at high temperature of two nut samples M12 according to the invention.

By way of example and for the sake of clarity in FIGS. 6, 7, the 8 and 9 features of braking torque of samples of nuts having a structure substantially identical to the one of the nuts of FIGS. 1, 2, 3 and 4 according to the prior art, are shown.

The experimental tests on the nuts according to the invention have been carried out both by means tests at ambient temperature (FIG. 6, 7) and by means of tests in which the nuts have been thermically stressed by heating to approximately 300° C. (FIGS. 8 and 9) in a way equivalent to the tests carried out on the nuts according to the prior art (FIG. 1 to 4).

Figure 9:
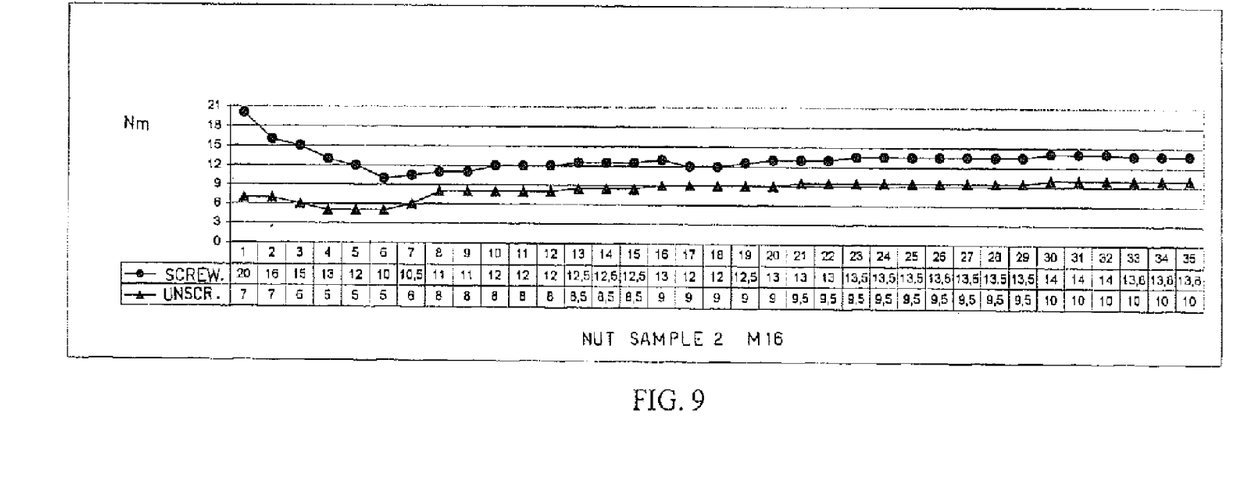
FIG. 9 shows braking torque values in Newton per meter (Nm) measured upon increasing the number of screwing/unscrewing cycles; values relate to tests of use at high temperature of two nut samples M16 according to the invention.

Tests have been carried out on nuts M12 (FIGS. 6 and 8) and M16 (FIGS. 7 and 9).

In all cases the values have been measured in repeated screwing/unscrewing cycles (35 cycles).

As easily comprehensible to a person skilled in the art, it is possible to infer from the above values, for instance by comparing the values shown in FIGS. 1, 2, 3 and 4 related to nuts according to the prior art and values shown in FIGS. 6, 7, 8, 9 related to nuts according to the invention, that the braking torques, in case of use of the springs according to the invention, are approximately better of a factor of 2 than those of the nuts according to the prior art and, above all, substantially constant upon increasing number of screwing/unscrewing cycles.

Thanks to the invention it is therefore possible to use several times and without risks the nut according to the invention on wear parts that require a high number of replacements in their life period irrespective of whether the nut is used on parts that work at low or high temperature.

Of course, obvious changes and/or variations to the above disclosure are possible, as regards dimensions, shapes and components, as well as details of the described structure and operation method without departing from the scope of the invention as defined by the claims that follow.

The invention claimed is:

1. A self-locking nut comprising an upper threaded collar provided with longitudinal slots, being V or U shaped, also with sharp edge, defining in the collar a plurality of circular arc segments compressed by an external helical spring, said slots having such a width as not to allow the mutual contact of said circular arc segments, wherein
   said spring is made of precipitation hardening stainless steel of semi-austenitic type; and
   said nut presents a high constancy of braking torque upon repeated screwing/unscrewing cycles.

2. The self-locking nut according to claim 1, wherein said spring comprises, as hardening element of said steel, aluminum or a compound thereof comprising aluminum.

3. The self-locking nut according to claim 1, wherein said nut presents said high constancy of braking torque in at least 30 screwing/unscrewing cycles.

4. A method for manufacturing a self-locking nut comprising the steps of:
   making a nut structure comprising an upper threaded collar having longitudinal slots being V or U shaped, also with sharp edge, defining in the collar a plurality of circular arc segments arranged to be compressed by an external helical spring;
   manufacturing the helical spring from precipitation hardening stainless steel;
   mounting the spring on the structure of the nut; and
   measuring a high constancy of braking torque values upon repeated screwing/unscrewing cycles.

5. The method according to claim 4, wherein the step of manufacturing said helical spring comprises the steps of:
   obtaining a wire of predetermined diameter from wire rods or bars of rolled sections made of precipitation hardening stainless steel of semi-austenitic type by means of one or more steps of drawing and annealing;
   winding the wire to a predetermined diameter; and
   cutting the wound wire according to a predetermined length for obtaining said helical spring.

6. The method according to claim 5, wherein the step of manufacturing said helical spring further comprises the step of subjecting said spring to a treatment of stabilization.

7. The method according to claim 5, wherein the step of manufacturing said helical spring further comprises the step of subjecting said spring to a treatment of stabilization of thermal type.

8. The method according to claim 4, wherein said step of measuring high constancy of braking torque values of said nuts comprises the step of measuring said high constancy of braking torque values in at least 30 screwing/unscrewing cycles.

9. A self-locking nut comprising:
   an upper threaded collar provided with longitudinal slots of V or U shape defining in the collar a plurality of circular arc segments compressed by an external helical spring, said slots having such a width as not to allow the mutual contact of said circular arc segments,
   wherein said spring is made of precipitation hardening stainless steel of semi-austenitic type, and
   wherein after at least 30 screwing/unscrewing cycles a braking torque of said nut is substantially equal to a braking torque of said nut before said at least 30 screwing/unscrewing cycles.

* * * * *